(No Model.)

E. T. PLATT.
INDEX FOR RATE TABLES.

No. 553,316.  3 Sheets—Sheet 1.

Patented Jan. 21, 1896.

TABLE A.
1 to 25 lbs.

| Lbs | A | B | C | D | E | F | G | H | I | K | L | M | N | O | P | Q | R | S | T | U | V | W | X | Y | Z |
|---|---|---|---|---|---|---|---|---|---|---|---|---|---|---|---|---|---|---|---|---|---|---|---|---|---|
| 1 | .25 | .25 | .25 | .25 | .25 | .25 | .25 | .25 | .25 | .25 | .25 | .25 | .25 | .25 | .25 | .25 | .25 | .25 | .25 | .25 | .25 | .25 | .25 | .25 | .25 |
| 2 | .25 | .25 | .25 | .25 | .25 | .25 | .25 | .25 | .30 | .30 | .30 | .30 | .30 | .30 | .30 | .30 | .30 | .30 | .30 | .30 | .30 | .30 | .30 | .30 | .30 |
| 3 | .25 | .25 | .25 | .25 | .30 | .30 | .30 | .35 | .40 | .45 | .45 | .45 | .45 | .45 | .45 | .45 | .45 | .45 | .45 | .45 | .45 | .45 | .45 | .45 | .45 |
| 4 | .25 | .25 | .25 | .30 | .30 | .35 | .35 | .40 | .45 | .50 | .55 | .55 | .60 | .60 | .60 | .60 | .60 | .60 | .60 | .60 | .60 | .60 | .60 | .60 | .60 |
| 5 | .25 | .25 | .25 | .30 | .35 | .40 | .40 | .45 | .50 | .55 | .55 | .65 | .65 | .65 | .65 | .65 | .65 | .70 | .70 | .70 | .70 | .70 | .70 | .70 | .70 |
| 6 | .25 | .30 | .30 | .35 | .35 | .40 | .45 | .50 | .55 | .65 | .65 | .70 | .70 | .75 | .75 | .75 | .75 | .85 | .85 | .90 | .90 | .95 | .95 | .95 | .95 |
| 7 | .25 | .30 | .30 | .35 | .40 | .45 | .45 | .50 | .55 | .65 | .65 | .70 | .70 | .75 | .75 | .75 | .75 | .85 | .85 | .90 | .90 | .95 | .95 | .95 | .95 |
| 8 | .25 | .30 | .30 | .35 | .40 | .45 | .50 | .55 | .60 | .75 | .75 | .75 | .90 | .90 | .90 | .90 | 1.00 | 1.00 | 1.00 | 1.00 | 1.15 | 1.15 | 1.15 | 1.15 | 1.15 |
| 9 | .25 | .30 | .30 | .35 | .40 | .45 | .50 | .55 | .60 | .75 | .75 | .75 | .90 | .90 | .90 | .90 | 1.00 | 1.00 | 1.00 | 1.00 | 1.15 | 1.15 | 1.15 | 1.15 | 1.15 |
| 10 | .25 | .30 | .30 | .35 | .40 | .45 | .50 | .55 | .60 | .75 | .75 | .75 | .90 | .90 | .90 | .90 | 1.00 | 1.00 | 1.00 | 1.00 | 1.15 | 1.15 | 1.15 | 1.15 | 1.15 |
| 11 | .25 | .30 | .30 | .35 | .40 | .50 | .60 | .60 | .70 | .80 | .80 | .85 | .85 | 1.00 | 1.00 | 1.00 | 1.00 | 1.10 | 1.10 | 1.15 | 1.15 | 1.35 | 1.35 | 1.35 | 1.35 |
| 12 | .25 | .30 | .30 | .35 | .40 | .50 | .60 | .60 | .70 | .80 | .80 | .85 | .85 | 1.00 | 1.00 | 1.00 | 1.00 | 1.10 | 1.10 | 1.15 | 1.15 | 1.35 | 1.35 | 1.35 | 1.35 |
| 13 | .25 | .30 | .30 | .35 | .40 | .50 | .60 | .60 | .70 | .80 | .80 | .85 | .85 | 1.00 | 1.00 | 1.00 | 1.00 | 1.10 | 1.10 | 1.15 | 1.15 | 1.35 | 1.35 | 1.35 | 1.35 |
| 14 | .25 | .30 | .30 | .35 | .40 | .50 | .60 | .60 | .70 | .80 | .80 | .85 | .85 | 1.00 | 1.00 | 1.00 | 1.00 | 1.10 | 1.10 | 1.15 | 1.15 | 1.35 | 1.35 | 1.35 | 1.35 |
| 15 | .25 | .30 | .30 | .35 | .40 | .50 | .60 | .60 | .70 | .80 | .80 | .85 | .85 | 1.00 | 1.00 | 1.00 | 1.00 | 1.10 | 1.10 | 1.15 | 1.15 | 1.35 | 1.35 | 1.35 | 1.35 |
| 16 | .25 | .30 | .30 | .35 | .45 | .55 | .65 | .70 | .80 | .90 | .90 | 1.00 | 1.00 | 1.15 | 1.15 | 1.15 | 1.15 | 1.25 | 1.25 | 1.30 | 1.30 | 1.65 | 1.65 | 1.65 | 1.65 |
| 17 | .25 | .30 | .30 | .35 | .45 | .55 | .65 | .70 | .80 | .90 | .90 | 1.00 | 1.00 | 1.15 | 1.15 | 1.15 | 1.15 | 1.25 | 1.25 | 1.30 | 1.30 | 1.65 | 1.65 | 1.65 | 1.65 |
| 18 | .25 | .30 | .30 | .35 | .45 | .55 | .65 | .70 | .80 | .90 | .90 | 1.00 | 1.00 | 1.15 | 1.15 | 1.15 | 1.15 | 1.25 | 1.25 | 1.30 | 1.30 | 1.65 | 1.65 | 1.65 | 1.65 |
| 19 | .25 | .30 | .30 | .35 | .45 | .55 | .65 | .70 | .80 | .90 | .90 | 1.00 | 1.00 | 1.15 | 1.15 | 1.15 | 1.15 | 1.25 | 1.25 | 1.30 | 1.30 | 1.65 | 1.65 | 1.65 | 1.65 |
| 20 | .25 | .30 | .30 | .35 | .45 | .55 | .65 | .70 | .80 | .90 | .90 | 1.00 | 1.00 | 1.15 | 1.15 | 1.15 | 1.15 | 1.25 | 1.25 | 1.30 | 1.30 | 1.65 | 1.65 | 1.65 | 1.65 |
| 21 | .25 | .35 | .35 | .40 | .50 | .60 | .70 | .75 | .90 | 1.00 | 1.00 | 1.10 | 1.10 | 1.25 | 1.25 | 1.30 | 1.30 | 1.50 | 1.50 | 1.50 | 1.50 | 1.85 | 1.85 | 1.85 | 1.85 |
| 22 | .25 | .35 | .35 | .40 | .50 | .60 | .70 | .75 | .90 | 1.00 | 1.00 | 1.10 | 1.10 | 1.25 | 1.25 | 1.30 | 1.30 | 1.50 | 1.50 | 1.50 | 1.50 | 1.85 | 1.85 | 1.85 | 1.85 |
| 23 | .25 | .35 | .35 | .40 | .50 | .60 | .70 | .75 | .90 | 1.00 | 1.00 | 1.10 | 1.10 | 1.25 | 1.25 | 1.30 | 1.30 | 1.50 | 1.50 | 1.50 | 1.50 | 1.85 | 1.85 | 1.85 | 1.85 |
| 24 | .25 | .35 | .35 | .40 | .50 | .60 | .70 | .75 | .90 | 1.00 | 1.00 | 1.10 | 1.10 | 1.25 | 1.25 | 1.30 | 1.30 | 1.50 | 1.50 | 1.50 | 1.50 | 1.85 | 1.85 | 1.85 | 1.85 |
| 25 | .25 | .35 | .35 | .40 | .50 | .60 | .70 | .75 | .90 | 1.00 | 1.00 | 1.10 | 1.10 | 1.25 | 1.25 | 1.30 | 1.30 | 1.50 | 1.50 | 1.50 | 1.50 | 1.85 | 1.85 | 1.85 | 1.85 |

TABLE A—Continued.
76 to 100 lbs.

| Lbs | A | B | C | D | E | F | G | H | I | K | L | M | N | O | P | Q | R | S | T | U | V | W | X | Y | Z |
|---|---|---|---|---|---|---|---|---|---|---|---|---|---|---|---|---|---|---|---|---|---|---|---|---|---|
| 76 | .40 | .50 | .60 | .75 | 1.00 | 1.25 | 1.50 | 1.60 | 1.52 | 1.71 | 1.90 | 2.09 | 2.28 | 2.47 | 2.66 | 2.85 | 3.04 | 3.23 | 3.42 | 3.61 | 3.80 | 3.99 | 4.18 | 4.37 | 4.56 |
| 77 | .40 | .50 | .60 | .75 | 1.00 | 1.25 | 1.50 | 1.60 | 1.54 | 1.74 | 1.93 | 2.12 | 2.31 | 2.51 | 2.70 | 2.89 | 3.08 | 3.25 | 3.47 | 3.66 | 3.85 | 4.05 | 4.24 | 4.43 | 4.62 |
| 78 | .40 | .50 | .60 | .75 | 1.00 | 1.25 | 1.50 | 1.60 | 1.56 | 1.76 | 1.95 | 2.15 | 2.34 | 2.54 | 2.73 | 2.93 | 3.12 | 3.32 | 3.51 | 3.71 | 3.90 | 4.10 | 4.29 | 4.49 | 4.68 |
| 79 | .40 | .50 | .60 | .75 | 1.00 | 1.25 | 1.50 | 1.60 | 1.58 | 1.78 | 1.98 | 2.18 | 2.37 | 2.57 | 2.77 | 2.97 | 3.16 | 3.36 | 3.56 | 3.76 | 3.95 | 4.15 | 4.35 | 4.55 | 4.74 |
| 80 | .40 | .50 | .60 | .75 | 1.00 | 1.25 | 1.50 | 1.60 | 1.60 | 1.80 | 2.00 | 2.20 | 2.40 | 2.60 | 2.80 | 3.00 | 3.20 | 3.40 | 3.60 | 3.80 | 4.00 | 4.20 | 4.40 | 4.60 | 4.80 |
| 81 | .40 | .50 | .60 | .75 | 1.00 | 1.25 | 1.50 | 1.70 | 1.62 | 1.83 | 2.03 | 2.23 | 2.43 | 2.64 | 2.84 | 3.04 | 3.24 | 3.45 | 3.65 | 3.85 | 4.05 | 4.26 | 4.46 | 4.66 | 4.86 |
| 82 | .40 | .50 | .60 | .75 | 1.00 | 1.25 | 1.50 | 1.70 | 1.64 | 1.85 | 2.05 | 2.26 | 2.46 | 2.67 | 2.87 | 3.08 | 3.28 | 3.49 | 3.69 | 3.90 | 4.10 | 4.31 | 4.51 | 4.72 | 4.92 |
| 83 | .40 | .50 | .60 | .75 | 1.00 | 1.25 | 1.50 | 1.70 | 1.66 | 1.87 | 2.08 | 2.29 | 2.49 | 2.70 | 2.91 | 3.12 | 3.32 | 3.53 | 3.74 | 3.95 | 4.15 | 4.36 | 4.57 | 4.78 | 4.98 |
| 84 | .40 | .50 | .60 | .75 | 1.00 | 1.25 | 1.50 | 1.70 | 1.68 | 1.89 | 2.10 | 2.31 | 2.52 | 2.73 | 2.94 | 3.15 | 3.36 | 3.57 | 3.78 | 3.99 | 4.20 | 4.41 | 4.62 | 4.83 | 5.04 |
| 85 | .40 | .50 | .60 | .75 | 1.00 | 1.25 | 1.50 | 1.70 | 1.70 | 1.92 | 2.13 | 2.34 | 2.55 | 2.77 | 2.98 | 3.19 | 3.40 | 3.62 | 3.83 | 4.04 | 4.25 | 4.47 | 4.68 | 4.89 | 5.10 |
| 86 | .40 | .50 | .60 | .75 | 1.00 | 1.25 | 1.50 | 1.75 | 1.72 | 1.94 | 2.15 | 2.37 | 2.58 | 2.80 | 3.01 | 3.23 | 3.44 | 3.66 | 3.87 | 4.09 | 4.30 | 4.52 | 4.73 | 4.95 | 5.16 |
| 87 | .40 | .50 | .60 | .75 | 1.00 | 1.25 | 1.50 | 1.75 | 1.74 | 1.96 | 2.18 | 2.40 | 2.61 | 2.83 | 3.05 | 3.27 | 3.48 | 3.70 | 3.92 | 4.14 | 4.35 | 4.57 | 4.79 | 5.01 | 5.22 |
| 88 | .40 | .50 | .60 | .75 | 1.00 | 1.25 | 1.50 | 1.75 | 1.76 | 1.98 | 2.20 | 2.42 | 2.64 | 2.86 | 3.08 | 3.30 | 3.52 | 3.74 | 3.96 | 4.18 | 4.40 | 4.62 | 4.84 | 5.06 | 5.28 |
| 89 | .40 | .50 | .60 | .75 | 1.00 | 1.25 | 1.50 | 1.75 | 1.78 | 2.01 | 2.23 | 2.45 | 2.67 | 2.90 | 3.12 | 3.34 | 3.56 | 3.79 | 4.01 | 4.23 | 4.45 | 4.68 | 4.90 | 5.12 | 5.34 |
| 90 | .40 | .50 | .60 | .75 | 1.00 | 1.25 | 1.50 | 1.75 | 1.80 | 2.03 | 2.25 | 2.48 | 2.70 | 2.93 | 3.15 | 3.38 | 3.60 | 3.83 | 4.05 | 4.28 | 4.50 | 4.73 | 4.95 | 5.18 | 5.40 |
| 91 | .40 | .50 | .60 | .75 | 1.00 | 1.25 | 1.50 | 1.75 | 1.82 | 2.05 | 2.28 | 2.51 | 2.73 | 2.96 | 3.19 | 3.42 | 3.64 | 3.87 | 4.10 | 4.33 | 4.55 | 4.78 | 5.01 | 5.24 | 5.46 |
| 92 | .40 | .50 | .60 | .75 | 1.00 | 1.25 | 1.50 | 1.75 | 1.84 | 2.07 | 2.30 | 2.53 | 2.76 | 2.99 | 3.22 | 3.45 | 3.68 | 3.91 | 4.14 | 4.37 | 4.60 | 4.83 | 5.06 | 5.29 | 5.52 |
| 93 | .40 | .50 | .60 | .75 | 1.00 | 1.25 | 1.50 | 1.75 | 1.86 | 2.10 | 2.33 | 2.56 | 2.79 | 3.03 | 3.26 | 3.49 | 3.72 | 3.96 | 4.19 | 4.42 | 4.65 | 4.89 | 5.12 | 5.35 | 5.58 |
| 94 | .40 | .50 | .60 | .75 | 1.00 | 1.25 | 1.50 | 1.75 | 1.88 | 2.12 | 2.35 | 2.59 | 2.82 | 3.06 | 3.29 | 3.53 | 3.76 | 4.00 | 4.23 | 4.47 | 4.70 | 4.94 | 5.17 | 5.41 | 5.64 |
| 95 | .40 | .50 | .60 | .75 | 1.00 | 1.25 | 1.50 | 1.75 | 1.90 | 2.14 | 2.38 | 2.62 | 2.85 | 3.09 | 3.33 | 3.57 | 3.80 | 4.04 | 4.28 | 4.52 | 4.75 | 4.99 | 5.23 | 6.47 | 5.70 |
| 96 | .40 | .50 | .60 | .75 | 1.00 | 1.25 | 1.50 | 1.75 | 1.92 | 2.16 | 2.40 | 2.64 | 2.88 | 3.12 | 3.36 | 3.60 | 3.84 | 4.08 | 4.32 | 4.56 | 4.80 | 5.04 | 5.28 | 5.52 | 5.7 |
| 97 | .40 | .50 | .60 | .75 | 1.00 | 1.25 | 1.50 | 1.75 | 1.94 | 2.19 | 2.43 | 2.67 | 2.91 | 3.16 | 3.40 | 3.64 | 3.88 | 4.13 | 4.37 | 4.61 | 4.85 | 5.10 | 5.34 | 5.58 | 5.82 |
| 98 | .40 | .50 | .60 | .75 | 1.00 | 1.25 | 1.50 | 1.75 | 1.96 | 2.21 | 2.45 | 2.70 | 2.94 | 3.19 | 3.43 | 3.68 | 3.92 | 4.17 | 4.41 | 4.66 | 4.90 | 5.15 | 5.39 | 5.64 | 5.88 |
| 99 | .40 | .50 | .60 | .75 | 1.00 | 1.25 | 1.50 | 1.75 | 1.98 | 2.23 | 2.48 | 2.73 | 2.97 | 3.22 | 3.47 | 3.72 | 3.96 | 4.21 | 4.46 | 4.71 | 4.95 | 5.20 | 5.45 | 5.69 | 5.94 |
| 100 | .40 | .50 | .60 | .75 | 1.00 | 1.25 | 1.50 | 1.75 | 2.00 | 2.25 | 2.50 | 2.75 | 3.00 | 3.25 | 3.50 | 3.75 | 4.00 | 4.25 | 4.50 | 4.75 | 5.00 | 5.25 | 5.50 | 5.75 | 6.00 |

Witnesses
Jno G. Hinkel
A. J. Whittaker.

Inventor
E. T. Platt
By Zeter & Freeman
attys (No Model.)

E. T. PLATT.

INDEX FOR RATE TABLES.

No. 553,316.

3 Sheets—Sheet 2.

Patented Jan. 21, 1896.

TABLE Q.
1 to 25 lbs.

| Lbs | QA | QB | QC | QD | QE | QF | QG | QH | QI | QK | QL | QM | QN | QO | QP | QQ | QR | QS | QT | QU | QV | QW | QX | QY | QZ |
|---|---|---|---|---|---|---|---|---|---|---|---|---|---|---|---|---|---|---|---|---|---|---|---|---|---|
| 1 | .30 | .30 | .30 | .35 | .35 | .35 | .35 | .35 | .35 | .35 | .35 | .35 | .35 | .35 | .35 | .35 | .35 | .35 | .35 | .40 | .40 | .40 | .40 | .40 | .25 |
| 2 | .35 | .35 | .35 | .40 | .40 | .40 | .40 | .40 | .40 | .40 | .40 | .45 | .45 | .45 | .45 | .45 | .45 | .45 | .45 | .50 | .50 | .50 | .50 | .50 | .30 |
| 3 | .45 | .45 | .45 | .50 | .50 | .50 | .50 | .50 | .50 | .50 | .50 | .55 | .55 | .55 | .55 | .60 | .60 | .60 | .60 | .60 | .60 | .60 | .60 | .60 | .45 |
| 4 | .60 | .60 | .60 | .65 | .65 | .65 | .65 | .65 | .65 | .65 | .65 | .75 | .75 | .75 | .75 | .75 | .75 | .75 | .75 | .80 | .80 | .80 | .80 | .80 | .60 |
| 5 | .80 | .80 | .80 | .85 | .85 | .85 | .85 | .85 | .85 | .85 | .85 | .90 | .90 | .90 | .90 | .95 | .95 | .95 | .95 | 1.00 | 1.00 | 1.00 | 1.00 | 1.00 | .75 |
| 6 | 1.10 | 1.10 | 1.10 | 1.15 | 1.15 | 1.15 | 1.15 | 1.15 | 1.15 | 1.15 | 1.15 | 1.25 | 1.25 | 1.25 | 1.25 | 1.40 | 1.40 | 1.40 | 1.40 | 1.50 | 1.50 | 1.50 | 1.50 | 1.50 | 1.00 |
| 7 | 1.10 | 1.10 | 1.10 | 1.15 | 1.15 | 1.15 | 1.15 | 1.15 | 1.15 | 1.15 | 1.15 | 1.25 | 1.25 | 1.25 | 1.25 | 1.40 | 1.40 | 1.40 | 1.40 | 1.50 | 1.50 | 1.50 | 1.50 | 1.50 | 1.00 |
| 8 | 2.50 | 2.50 | 2.50 | 2.50 | 2.50 | 2.50 | 2.50 | 2.50 | 2.50 | 2.50 | 2.50 | 2.50 | 2.50 | 2.50 | 2.50 | 2.50 | 2.50 | 2.50 | 2.50 | 2.50 | 2.65 | 2.65 | 2.65 | 2.65 | 2.00 |
| 9 | 2.50 | 2.50 | 2.50 | 2.50 | 2.50 | 2.50 | 2.50 | 2.50 | 2.50 | 2.50 | 2.50 | 2.50 | 2.50 | 2.50 | 2.50 | 2.50 | 2.50 | 2.50 | 2.50 | 2.50 | 2.65 | 2.65 | 2.65 | 2.65 | 2.00 |
| 10 | 2.50 | 2.50 | 2.50 | 2.50 | 2.50 | 2.50 | 2.50 | 2.50 | 2.50 | 2.50 | 2.50 | 2.50 | 2.50 | 2.50 | 2.50 | 2.50 | 2.50 | 2.50 | 2.50 | 2.50 | 2.65 | 2.65 | 2.65 | 2.65 | 2.00 |
| 11 | 3.10 | 3.10 | 3.10 | 3.10 | 3.10 | 3.10 | 3.10 | 3.10 | 3.10 | 3.25 | 3.25 | 3.25 | 3.25 | 3.25 | 3.25 | 3.25 | 3.25 | 3.25 | 3.25 | 3.25 | 3.45 | 3.45 | 3.45 | 3.45 | 2.25 |
| 12 | 3.10 | 3.10 | 3.10 | 3.10 | 3.10 | 3.10 | 3.10 | 3.10 | 3.10 | 3.25 | 3.25 | 3.25 | 3.25 | 3.25 | 3.25 | 3.25 | 3.25 | 3.25 | 3.25 | 3.25 | 3.45 | 3.45 | 3.45 | 3.45 | 2.25 |
| 13 | 3.10 | 3.10 | 3.10 | 3.10 | 3.10 | 3.10 | 3.10 | 3.10 | 3.10 | 3.25 | 3.25 | 3.25 | 3.25 | 3.25 | 3.25 | 3.25 | 3.25 | 3.25 | 3.25 | 3.25 | 3.45 | 3.45 | 3.45 | 3.45 | 2.25 |
| 14 | 3.10 | 3.10 | 3.10 | 3.10 | 3.10 | 3.10 | 3.10 | 3.10 | 3.10 | 3.25 | 3.25 | 3.25 | 3.25 | 3.25 | 3.25 | 3.25 | 3.25 | 3.25 | 3.25 | 3.25 | 3.45 | 3.45 | 3.45 | 3.45 | 2.25 |
| 15 | 3.10 | 3.10 | 3.10 | 3.10 | 3.10 | 3.10 | 3.10 | 3.10 | 3.10 | 3.25 | 3.25 | 3.25 | 3.25 | 3.25 | 3.25 | 3.25 | 3.25 | 3.25 | 3.25 | 3.25 | 3.45 | 3.45 | 3.45 | 3.45 | 2.25 |
| 16 | 3.75 | 3.75 | 3.75 | 3.75 | 3.75 | 3.75 | 3.75 | 3.75 | 4.00 | 4.00 | 4.00 | 4.00 | 4.00 | 4.00 | 4.00 | 4.00 | 4.10 | 4.10 | 4.10 | 4.10 | 4.25 | 4.25 | 4.25 | 4.25 | 2.55 |
| 17 | 3.75 | 3.75 | 3.75 | 3.75 | 3.75 | 3.75 | 3.75 | 3.75 | 4.00 | 4.00 | 4.00 | 4.00 | 4.00 | 4.00 | 4.00 | 4.00 | 4.10 | 4.10 | 4.10 | 4.10 | 4.25 | 4.25 | 4.25 | 4.25 | 2.55 |
| 18 | 3.75 | 3.75 | 3.75 | 3.75 | 3.75 | 3.75 | 3.75 | 3.75 | 4.00 | 4.00 | 4.00 | 4.00 | 4.00 | 4.00 | 4.00 | 4.00 | 4.10 | 4.10 | 4.10 | 4.10 | 4.25 | 4.25 | 4.25 | 4.25 | 2.55 |
| 19 | 3.75 | 3.75 | 3.75 | 3.75 | 3.75 | 3.75 | 3.75 | 3.75 | 4.00 | 4.00 | 4.00 | 4.00 | 4.00 | 4.00 | 4.00 | 4.00 | 4.10 | 4.10 | 4.10 | 4.10 | 4.25 | 4.25 | 4.25 | 4.25 | 2.55 |
| 20 | 3.75 | 3.75 | 3.75 | 3.75 | 3.75 | 3.75 | 3.75 | 3.75 | 4.00 | 4.00 | 4.00 | 4.00 | 4.00 | 4.00 | 4.00 | 4.00 | 4.10 | 4.10 | 4.10 | 4.10 | 4.25 | 4.25 | 4.25 | 4.25 | 2.55 |
| 21 | 4.50 | 4.50 | 4.50 | 4.50 | 4.75 | 4.75 | 4.75 | 4.75 | 5.00 | 5.00 | 5.00 | 5.00 | 5.00 | 5.00 | 5.00 | 5.00 | 5.00 | 5.00 | 5.00 | 5.00 | 5.25 | 5.25 | 5.25 | 5.25 | 3.00 |
| 22 | 4.50 | 4.50 | 4.50 | 4.50 | 4.75 | 4.75 | 4.75 | 4.75 | 5.00 | 5.00 | 5.00 | 5.00 | 5.00 | 5.00 | 5.00 | 5.00 | 5.00 | 5.00 | 5.00 | 5.00 | 5.25 | 5.25 | 5.25 | 5.25 | 3.00 |
| 23 | 4.50 | 4.50 | 4.50 | 4.50 | 4.75 | 4.75 | 4.75 | 4.75 | 5.00 | 5.00 | 5.00 | 5.00 | 5.00 | 5.00 | 5.00 | 5.00 | 5.00 | 5.00 | 5.00 | 5.00 | 5.25 | 5.25 | 5.25 | 5.25 | 3.00 |
| 24 | 4.50 | 4.50 | 4.50 | 4.50 | 4.75 | 4.75 | 4.75 | 4.75 | 5.00 | 5.00 | 5.00 | 5.00 | 5.00 | 5.00 | 5.00 | 5.00 | 5.00 | 5.00 | 5.00 | 5.00 | 5.25 | 5.25 | 5.25 | 5.25 | 3.00 |
| 25 | 4.50 | 4.50 | 4.50 | 4.50 | 4.75 | 4.75 | 4.75 | 4.75 | 5.00 | 5.00 | 5.00 | 5.00 | 5.00 | 5.00 | 5.00 | 5.00 | 5.00 | 5.00 | 5.00 | 5.00 | 5.25 | 5.25 | 5.25 | 5.25 | 3.00 |

TABLE Q—Continued.
26 to 50 lbs.

| Lbs | QA | QB | QC | QD | QE | QF | QG | QH | QI | QK | QL | QM | QN | QO | QP | QQ | QR | QS | QT | QU | QV | QW | QX | QY | QZ |
|---|---|---|---|---|---|---|---|---|---|---|---|---|---|---|---|---|---|---|---|---|---|---|---|---|---|
| 26 | 4.85 | 4.85 | 4.85 | 4.85 | 5.35 | 5.35 | 5.35 | 5.35 | 5.60 | 5.60 | 5.60 | 5.60 | 5.60 | 5.60 | 5.60 | 5.60 | 5.80 | 5.80 | 5.80 | 5.80 | 6.10 | 6.10 | 6.10 | 6.10 | 3.35 |
| 27 | 4.85 | 4.85 | 4.85 | 4.85 | 5.35 | 5.35 | 5.35 | 5.35 | 5.60 | 5.60 | 5.60 | 5.60 | 5.60 | 5.60 | 5.60 | 5.60 | 5.80 | 5.80 | 5.80 | 5.80 | 6.10 | 6.10 | 6.10 | 6.10 | 3.35 |
| 28 | 4.85 | 4.85 | 4.85 | 4.85 | 5.35 | 5.35 | 5.35 | 5.35 | 5.60 | 5.60 | 5.60 | 5.60 | 5.60 | 5.60 | 5.60 | 5.60 | 5.80 | 5.80 | 5.80 | 5.80 | 6.10 | 6.10 | 6.10 | 6.10 | 3.35 |
| 29 | 4.85 | 4.85 | 4.85 | 4.85 | 5.35 | 5.35 | 5.35 | 5.35 | 5.60 | 5.60 | 5.60 | 5.60 | 5.60 | 5.60 | 5.60 | 5.60 | 5.80 | 5.80 | 5.80 | 5.80 | 6.10 | 6.10 | 6.10 | 6.10 | 3.35 |
| 30 | 4.85 | 4.85 | 4.85 | 4.85 | 5.35 | 5.35 | 5.35 | 5.35 | 5.60 | 5.60 | 5.60 | 5.60 | 5.60 | 5.60 | 5.60 | 5.60 | 5.80 | 5.80 | 5.80 | 5.80 | 6.10 | 6.10 | 6.10 | 6.10 | 3.35 |
| 31 | 5.55 | 5.55 | 5.55 | 5.55 | 6.05 | 6.05 | 6.05 | 6.05 | 6.55 | 6.55 | 6.55 | 6.55 | 6.55 | 6.55 | 6.55 | 6.55 | 6.70 | 6.70 | 6.70 | 6.70 | 7.05 | 7.05 | 7.05 | 7.05 | 3.80 |
| 32 | 5.55 | 5.55 | 5.55 | 5.55 | 6.05 | 6.05 | 6.05 | 6.05 | 6.55 | 6.55 | 6.55 | 6.55 | 6.55 | 6.55 | 6.55 | 6.55 | 6.70 | 6.70 | 6.70 | 6.70 | 7.05 | 7.05 | 7.05 | 7.05 | 3.80 |
| 33 | 5.55 | 5.55 | 5.55 | 5.55 | 6.05 | 6.05 | 6.05 | 6.05 | 6.55 | 6.55 | 6.55 | 6.55 | 6.55 | 6.55 | 6.55 | 6.55 | 6.70 | 6.70 | 6.70 | 6.70 | 7.05 | 7.05 | 7.05 | 7.05 | 3.80 |
| 34 | 5.55 | 5.55 | 5.55 | 5.55 | 6.05 | 6.05 | 6.05 | 6.05 | 6.55 | 6.55 | 6.55 | 6.55 | 6.55 | 6.55 | 6.55 | 6.55 | 6.70 | 6.70 | 6.70 | 6.70 | 7.05 | 7.05 | 7.05 | 7.05 | 3.80 |
| 35 | 5.55 | 5.55 | 5.55 | 5.55 | 6.05 | 6.05 | 6.05 | 6.05 | 6.55 | 6.55 | 6.55 | 6.55 | 6.55 | 6.55 | 6.55 | 6.55 | 6.70 | 6.70 | 6.70 | 6.70 | 7.05 | 7.05 | 7.05 | 7.05 | 3.80 |
| 36 | 6.25 | 6.25 | 6.25 | 6.25 | 6.75 | 6.75 | 6.75 | 6.75 | 7.25 | 7.25 | 7.25 | 7.25 | 7.25 | 7.25 | 7.25 | 7.25 | 7.60 | 7.60 | 7.60 | 7.60 | 8.00 | 8.00 | 8.00 | 8.00 | 4.25 |
| 37 | 6.25 | 6.25 | 6.25 | 6.25 | 6.75 | 6.75 | 6.75 | 6.75 | 7.25 | 7.25 | 7.25 | 7.25 | 7.25 | 7.25 | 7.25 | 7.25 | 7.60 | 7.60 | 7.60 | 7.60 | 8.00 | 8.00 | 8.00 | 8.00 | 4.25 |
| 38 | 6.25 | 6.25 | 6.25 | 6.25 | 6.75 | 6.75 | 6.75 | 6.75 | 7.25 | 7.25 | 7.25 | 7.25 | 7.25 | 7.25 | 7.25 | 7.25 | 7.60 | 7.60 | 7.60 | 7.60 | 8.00 | 8.00 | 8.00 | 8.00 | 4.25 |
| 39 | 6.25 | 6.25 | 6.25 | 6.25 | 6.75 | 6.75 | 6.75 | 6.75 | 7.25 | 7.25 | 7.25 | 7.25 | 7.25 | 7.25 | 7.25 | 7.25 | 7.60 | 7.60 | 7.60 | 7.60 | 8.00 | 8.00 | 8.00 | 8.00 | 4.25 |
| 40 | 6.25 | 6.25 | 6.25 | 6.25 | 6.75 | 6.75 | 6.75 | 6.75 | 7.25 | 7.25 | 7.25 | 7.25 | 7.25 | 7.25 | 7.25 | 7.25 | 7.60 | 7.60 | 7.60 | 7.60 | 8.00 | 8.00 | 8.00 | 8.00 | 4.25 |
| 41 | 6.80 | 6.90 | 6.90 | 6.90 | 7.30 | 7.40 | 7.40 | 7.40 | 7.80 | 7.90 | 7.90 | 7.90 | 8.00 | 8.00 | 8.00 | 8.00 | 8.45 | 8.45 | 8.45 | 8.45 | 8.90 | 8.90 | 8.90 | 8.90 | 4.65 |
| 42 | 6.80 | 6.90 | 6.90 | 6.90 | 7.30 | 7.40 | 7.40 | 7.40 | 7.80 | 7.90 | 7.90 | 7.90 | 8.00 | 8.00 | 8.00 | 8.00 | 8.45 | 8.45 | 8.45 | 8.45 | 8.90 | 8.90 | 8.90 | 8.90 | 4.65 |
| 43 | 6.80 | 6.90 | 6.90 | 6.90 | 7.30 | 7.40 | 7.40 | 7.40 | 7.80 | 7.90 | 7.90 | 7.90 | 8.00 | 8.00 | 8.00 | 8.00 | 8.45 | 8.45 | 8.45 | 8.45 | 8.90 | 8.90 | 8.90 | 8.90 | 4.65 |
| 44 | 6.80 | 6.90 | 6.90 | 6.90 | 7.30 | 7.40 | 7.40 | 7.40 | 7.80 | 7.90 | 7.90 | 7.90 | 8.00 | 8.00 | 8.00 | 8.00 | 8.45 | 8.45 | 8.45 | 8.45 | 8.90 | 8.90 | 8.90 | 8.90 | 4.65 |
| 45 | 6.80 | 6.90 | 6.90 | 6.90 | 7.30 | 7.40 | 7.40 | 7.40 | 7.80 | 7.90 | 7.90 | 7.90 | 8.00 | 8.00 | 8.00 | 8.00 | 8.45 | 8.45 | 8.45 | 8.45 | 8.90 | 8.90 | 8.90 | 8.90 | 4.65 |
| 46 | 6.80 | 6.90 | 7.05 | 7.15 | 7.30 | 7.40 | 7.55 | 7.65 | 7.80 | 7.90 | 8.05 | 8.15 | 8.30 | 8.40 | 8.55 | 8.65 | 8.80 | 8.90 | 9.05 | 9.15 | 9.30 | 9.40 | 9.55 | 9.65 | 4.65 |
| 47 | 6.80 | 6.90 | 7.05 | 7.15 | 7.30 | 7.40 | 7.55 | 7.65 | 7.80 | 7.90 | 8.05 | 8.15 | 8.30 | 8.40 | 8.55 | 8.65 | 8.80 | 8.90 | 9.05 | 9.15 | 9.30 | 9.40 | 9.55 | 9.65 | 4.65 |
| 48 | 6.80 | 6.90 | 7.05 | 7.15 | 7.30 | 7.40 | 7.55 | 7.65 | 7.80 | 7.90 | 8.05 | 8.15 | 8.30 | 8.40 | 8.55 | 8.65 | 8.80 | 8.90 | 9.05 | 9.15 | 9.30 | 9.40 | 9.55 | 9.65 | 4.65 |
| 49 | 6.80 | 6.90 | 7.05 | 7.15 | 7.30 | 7.40 | 7.55 | 7.65 | 7.80 | 7.90 | 8.05 | 8.15 | 8.30 | 8.40 | 8.55 | 8.65 | 8.80 | 8.90 | 9.05 | 9.15 | 9.30 | 9.40 | 9.55 | 9.65 | 4.65 |
| 50 | 6.80 | 6.90 | 7.05 | 7.15 | 7.30 | 7.40 | 7.55 | 7.65 | 7.80 | 7.90 | 8.05 | 8.15 | 8.30 | 8.40 | 8.55 | 8.65 | 8.80 | 8.90 | 9.05 | 9.15 | 9.30 | 9.40 | 9.55 | 9.65 | 4.65 |

Over 50 lbs., multiply by rate per cwt.

Witnesses
Jno G Hinkel
A. E. Whittaker

Inventor
E. T. Platt
By Arthur Freeman
Attys (No Model.)

3 Sheets—Sheet 3.

E. T. PLATT.
INDEX FOR RATE TABLES.

No. 553,316.

Patented Jan. 21, 1896.

| CALIFORNIA. Continued. | Less than 100 lbs. Instructions, inside page of cover. | Per 100 lbs or over. | CALIFORNIA. Continued. | Less than 100 lbs. Instructions, inside page of cover. | Per 100 lbs or over. |
|---|---|---|---|---|---|
| Ona | Q S | 17.75 | Rio Vista | Q K | 15.75 |
| Ontario | Q H | 15.25 | Ripon | Q H | 15.25 |
| Orange | Q H | 15.25 | Rivera | Q H | 15.25 |
| Orland | Q N | 16.50 | Riverside | Q H | 15.25 |
| Oro Grand | Q H | 15.25 | Rocklin | Q H | 15.25 |
| Oroville | Q K | 15.75 | Rodeo | | |
| Pacific Grove | Q N | 16.50 | *Rohnerville | W Z | 17.75 |
| Pajaro | Q L | 16.00 | Roseville | Q H | 15.25 |
| Palermo | Q K | 15.75 | Ross Station | Q K | 15.75 |
| Palmdale | Q H | 15.25 | Routier | Q K | 15.75 |
| Palm Springs | | | Rutherford | Q L | 16.00 |
| Palo Alto Station | | | Sacramento | Q D | 14.25 |
| *Paraiso Springs | Q P | 17.50 | Saint Helena | Q L | 16.00 |
| Pasadena | Q H | 15.25 | Salinas | Q L | 16.00 |
| Paso Robles | Q P | 17.00 | Salton | Q H | 15.25 |
| Penryn | Q H | 15.25 | *San Andeas | Q S | 17.75 |
| Perkins | Q I | 15.50 | San Anselmo | Q K | 15.75 |
| Perris | Q H | 15.25 | San Ardo | Q O | 16.75 |
| *Pascadero | Q W | 18.75 | San Bernardino | Q H | 15.25 |
| Petaluma | Q K | 15.75 | San Diego | Q D | 14.25 |
| Peters | Q K | 15.75 | San Dimas | | |
| Pieta | Q O | 16.75 | San Fernando | Q H | 15.25 |
| Pinole | Q H | 15.25 | San Francisco | Q D | 14.25 |
| Piru | Q K | 15.75 | San Francisco (3rd St. | | |
| Pixley | Q H | 15.25 | Depot) | | |
| Placerville | Q L | 16.00 | San Francisco | | |
| Pleasanton | Q H | 15.25 | (Valencia St. Station) | | |
| *Plymouth | Q T | 18.00 | San Gabriel | Q H | 15.25 |
| *Point Arena | W Z | 21.00 | Sanger | Q K | 15.75 |
| Point Rezes | Q M | 16.25 | *San Gregorio | Q V | 18.50 |
| Pokegama | | | San Jacinto | Q H | 15.25 |
| Pollasky | | | San Jose | Q D | 14.25 |
| Pomona | Q H | 15.25 | *San Juan | Q N | 16.50 |
| Pope Valley | Q O | 16.75 | San Leandro | Q H | 15.25 |
| Port Costa | Q H | 15.75 | San Lorenzo | Q H | 15.25 |
| Porterville | Q L | 16.00 | San Lucas | Q O | 16.75 |
| *Port Harford | W Z | 16.25 | *San Luis Obispo | W Z | 16.75 |
| Port Los Angeles | | | San Mateo | Q K | 15.75 |
| Poso | Q H | 15.25 | San Miguel | Q O | 16.75 |
| *Prattville | W Z | 20.25 | San Pablo | Q H | 15.25 |
| Preston | Q M | 16.25 | San Pedro | K | 15.75 |
| Princeton | Q P | 17.00 | San Quentin | Q K | 15.75 |
| Puente | Q H | 15.25 | San Rafael | Q K | 15.75 |
| *Quincey | W Z | 21.75 | San Ramon | Q L | 16.00 |
| Ravenna | Q H | 15.25 | *San Simeon | W Z | 16.25 |
| Raymond (Fresno Co.) | Q K | 15.75 | Santa Ana | Q H | 15.25 |
| Red Bluff | Q N | 16.50 | Santa Auita | Q H | 15.25 |
| Redding | Q O | 16.75 | Santa Barbara | Q M | 16.25 |
| Redlands | Q H | 15.25 | Santa Clara | Q K | 15.75 |
| Redondo Beach | Q H | 11.25 | Santa Cruz | Q L | 16.00 |
| Redwood | Q K | 15.75 | Santa Margarita | Q P | 17.00 |
| Reedley | Q L | 16.00 | *Santa Maria | W Z | 16.25 |
| Rialto | Q H | 15.25 | Santa Monica | Q K | 15.75 |

| ILLINOIS. Continued. | Less than 100 lbs. Instructions, inside page of cover. | Per 100 lbs or over. | ILLINOIS. Continued. | Less than 100 lbs. Instructions, inside page of cover. | Per 100 lbs or over. |
|---|---|---|---|---|---|
| Burlington | E E | 2.75 | Champaign | A M | 2.75 |
| Burnside | | | Chana | A O | 3.25 |
| (Hancock Co.) | A P | 3.50 | Chandlerville | A O | 3.25 |
| Burnside Crossing | | | Chamahon or | | |
| (Cook Co.) | D K | 2.65 | Minooka | A M | 2.75 |
| Burton View | D N | 3.40 | Chapin | A O | 3.25 |
| Bushnell | A O | 3.25 | Charleston | F Q | 2.75 |
| Bushton | F S | 3.25 | Charlotte | F R | 3.00 |
| Butler | E G | 3.25 | Charter Grove | E E | 2.75 |
| Byron | A N | 3.00 | Chatham | A N | 3.00 |
| Cabery | F R | 3.00 | Chatsworth | A N | 3.00 |
| Cable | A Q | 3.75 | Chatton | E H | 3.50 |
| Cadwell | F S | 3.25 | Chebanse | E Y | 2.85 |
| Cairo | A N | 3.00 | Cheltenham | D K | 2.65 |
| Caledonia (Boone Co.) | F R | 3.00 | Chemung | E Y | 2.85 |
| Calhoun | D M | 3.15 | Cheneyville | A M | 2.75 |
| Camargo | G H | 2.90 | Chenoa | A N | 3.00 |
| Cambridge | A O | 3.25 | Cherry Point | F Q | 2.75 |
| Cameron | A O | 3.25 | Cherry Valley | G I | 3.15 |
| Campbells Hill | A P | 3.50 | Chester | A P | 3.50 |
| Camp Point | A P | 3.50 | Chesterfield | D N | 3.40 |
| Campus | E Y | 2.85 | Chesterville | G H | 3.00 |
| Caneyville | D M | 3.15 | Chestnut | D N | 3.40 |
| Canton | A O | 3.25 | Chicago | A K | 2.25 |
| Cantrall | A O | 3.25 | Chicago—18th St. & | | |
| Capron | E Y | 2.85 | Western Ave. | A K | 2.25 |
| Carbon Cliff | A O | 3.25 | Chicago—100th St. | A K | 2.25 |
| Carbondale | A N | 3.00 | Chicago Heights | D K | 2.65 |
| Carlinville | A N | 3.00 | Chicago Lawn | D K | 2.65 |
| Carlock | A N | 3.00 | Chillicothe | A O | 3.25 |
| Carlton | F R | 3.00 | Chrisman | F Q | 2.75 |
| Carlyle | A N | 3.00 | Christopher | A P | 3.50 |
| Carman | A P | 3.50 | Cisco | E H | 3.50 |
| Carmi | A N | 3.00 | Cisne | A N | 3.00 |
| Carpenter | D M | 3.15 | Cissna Park | G I | 3.15 |
| Carpentersville | | | Civer | A O | 3.25 |
| (Kane Co.) | D K | 2.85 | Clare (De Kalb Co.) | A M | 2.75 |
| Carrier Mills | E G | 3.25 | Claremont | A M | 2.75 |
| Carrollton | A N | 3.00 | Clarkdale Junc. | D K | 2.65 |
| Carterville | | | Clarksdale | F B | 3.60 |
| (Williamson Co.) | D N | 3.40 | Clay City | A M | 2.75 |
| Carthage | A P | 3.50 | Clayton | E H | 3.50 |
| Cary | E E | 2.75 | Claytonville | F R | 3.00 |
| Casey | A L | 2.50 | Clifton (Iroquois Co.) | F R | 3.00 |
| Caseyville | A N | 3.00 | Clinton | G I | 3.25 |
| Cass | A O | 3.25 | Clio | E H | 3.50 |
| Castleton (Stark Co.) | A O | 3.25 | Cloverdale | E E | 2.75 |
| Catlin | D L | 2.90 | Clyde (Cook Co.) | A L | 2.50 |
| Cave-in-Rock | A N | 3.00 | Clyde (Macoupin Co.) | D N | 3.15 |
| Cayuga | A M | 2.75 | Coal City | E Y | 2.85 |
| Cazenovia | A O | 3.25 | Coal Valley | A P | 3.50 |
| Central City | D N | 3.40 | Coatsburg | A P | 3.50 |
| Centralia | A N | 3.00 | Cobden | F B | 3.60 |
| Cerro Gordo | | | Coffeen | E G | 3.25 |
| (Piatt Co. | D N | 3.40 | Colchester | A P | 3.50 |
| Chadwick | A O | 3.25 | Colehour | D K | 2.65 |

Witnesses:
Jno. G. Hinkel
J. A. Fangrieve

Inventor:
Edward T. Platt
by Foster Freeman
attorneys.

UNITED STATES PATENT OFFICE.

EDWARD T. PLATT, OF WASHINGTON, DISTRICT OF COLUMBIA.

INDEX FOR RATE-TABLES.

SPECIFICATION forming part of Letters Patent No. 553,316, dated January 21, 1896.

Application filed May 23, 1895. Serial No. 550,359. (No specimens.)

*To all whom it may concern:*

Be it known that I, EDWARD T. PLATT, a citizen of the United States, residing at Washington, in the District of Columbia, have invented certain new and useful Improvements in Indexes for Rate-Tables, of which the following is a specification.

It is not uncommon in express offices, railway offices, &c., where tickets must be sold, or cost of freight transportation given to numerous points, to prepare a table giving the various amounts arranged successively in the order of their increase, to which ready reference may be made, and which will facilitate the calculations of clerks or others in estimating the cost to any particular point. Such calculations, however, require more or less time, and often being made hastily under pressure of business and by clerks who are sometimes incompetent mistakes very frequently occur, resulting in loss either to the transportation company or the sender, while the difficulty and delay of accurately and quickly determining the cost to any given point and the necessity of sending to the office of the transportation company in order to ascertain the cost to different points for different quantities have proved a source of great annoyance to senders and of loss to the different express and other companies in depriving them of business which they would otherwise have.

It is the object of my invention to enable any person, without the necessity of any calculation, to ascertain the exact fare or cost of freight for any unit or multiplication of units to any point within the limits of the operation of the transportation company, and to this end I have devised an index adapted for use in connection with the tables and certain indicators upon the tables in such manner that any one provided with said index and tables and desiring to know the rate of transportation for any unit or number of units to a given point may, by reference to the name of such point in the index and by inspection of the table and its subdivision designated in said index, ascertain at once exactly and without any calculation the total payment required.

In the accompanying drawings, I have shown in Sheet 1 parts of one table indicating charges under "simple rates" from one to one hundred pounds; in Sheet 2, parts of a table showing under "compound rates" charges from one to fifty pounds, and in Sheet 3 I have shown part of the index used in connection with such tables.

For the purpose of illustrating my invention and of explaining the same I have illustrated such rates and tables as are required for the transaction of the business of an express company where the lowest rate is forty cents per hundred pounds, and higher rates are fifty, sixty, seventy-five cents, &c., per hundred pounds, and no charge is less than twenty-five cents, although it will be evident that these figures will vary. Upon this assumption I prepare any desired number of tables, and each table or each subdivision (as for facility of printing and binding the tables may sometimes be subdivided) contains a column at one end, having the successive numbers 1, 2, 3, up to 100, and indicating the units, as the number of pounds or passengers. Following this units-column is a series of parallel columns, the first of which opposite each unit indicates the charge for sending the number of persons or pounds indicated by the said unit to a certain distance or assumed distance. The second column contains another series of numbers, which specify the different charges for sending the number of persons or pounds indicated by the opposite units to a different point or distance. The third column in like manner contains the series of numbers indicating other charges for other points or distances. I have said that these points or distances may be assumed, because no column has any specific reference to any specific point or points or distances. The figures in all cases are arbitrary, it being simply necessary that there should be at some points in some of the tables figures indicating all of the different charges that may be made for any unit from one to one hundred to all of the points within the scope of operations of the company, and it will be understood that in very many instances the charge for a distant point is less than that for a nearer point.

At the head of each column of each table is a different character, preferably the letters of the alphabet, which, as shown, follow each other successively, (the letter J being omitted,) and each table has an indicator character, which may be arbitrary or a number or a letter, only the tables designated by A and Q being shown, and the designating character or letter of each table preferably being indicated at the head of each column.

The progressive charges to successive points or stations of a single line (where the charge increases according to the distance) will be indicated under what I term "simple rates," and three or four tables will generally suffice for these charges; but where a charge must be made for transportation to a point upon one line, and then from the latter to successive points upon another line having a different transportation rate, and possibly from the second line to a point upon the third line having another transportation rate, the different rates have to be considered and the resultant rates I term "compound rates," and these necessitate a large number of additional tables in each of which I indicate the units from one to one hundred in one of the terminal columns, with column-numbers indicating successively the different charges at the compound rates.

If desired for convenience in printing and publishing each table may be subdivided so as to contain but twenty-five or fifty parallel rows of figures, and where there are simple rates and the charge for any additional number of units may be readily ascertained by multiplication it may not be necessary to carry the rows beyond twenty-five or fifty, although it is desirable in most instances to have every rate for every distance fully set forth and dispense with all computation whatever. With these tables I combine an index which contains the names of the different points or places or stations included within the scope of the operations of the company, and which may be alphabetically arranged throughout or alphabetically arranged under an alphabetical arrangement of the names of the different States or countries. With these names are combined two series of characters—that is, there are two characters opposite each name—one of said characters referring to the indicator of one of the tables and the other of said characters referring to the column in such table which will indicate the charge for one or more pounds to the said place indicated by the said name.

Thus, assuming that it is desired to send a package to Chicago, Illinois, the name "Chicago" is found in the index with the letters A K opposite the same, which indicate that the table A is to be consulted and that the column K is to be found in said table, and this column will indicate the various charges for packages weighing from one to one hundred pounds to Chicago. If, for instance, the package weighs twenty-three pounds, the amount (one dollar) will be found in the column K of table A on the units-line 23, which will show the correct charge (one dollar) for such package to such place.

If it is desired to send a package to San Francisco, California, reference to the name of the city will show that it is followed by the index-letters Q D, which requires reference to the table Q and the column D, and if the package weighs twenty-four pounds the number 4.50 upon the units-row 24 in said column D will indicate the correct sum (four dollars and fifty cents) for sending such a package to that city.

It will be seen that an index of this character in connection with the tables having corresponding indicators, as to tables and columns, to those contained in the index will enable any one possessing the index and tables to determine in a few moments the cost of sending any weight of package less than one hundred pounds to any point designated in the index, and in order to ascertain the amount required to send a package of over one hundred pounds it is only necessary to add to the index a second column designating the rate per hundred pounds or over. Thus, as shown, the rate per hundred pounds to Chicago (indicated in the second column) is two dollars and twenty-five cents, while that to San Francisco is fourteen dollars and twenty-five cents.

The above-described index, in connection with the reference-tables, has been in use for some months, and has not only proved to result in great saving of time and expense and avoidance of vexation to the transportation company, but has proved to be so serviceable to shippers in affording ready means of determining costs of transportation that the increase of business from such source has been over twenty-five per cent. in said time.

Without limiting myself to the use of any special indicators or to the arrangement of figures or numbers shown, I claim as my invention—

The combination with tables having horizontal parallel rows of figures sub-divided into vertical columns indicating progressive charges for transportation, and figures at the ends of the horizontal rows indicating progressively the number of units of weight measure, of an indicator character upon each table, a series of indicator characters at the heads of the vertical columns, and an index consisting of a series of names of different places or points, and two characters opposite each name, one corresponding with the indicator character of one of the tables, and the other with the indicator character of one of the columns on that table that contains the charges for different units to the point or place having such name, substantially as set forth.

In testimony whereof I have signed my name to this specification in the presence of two subscribing witnesses.

EDWARD T. PLATT.

Witnesses:
F. L. FREEMAN,
S. H. BOWMAN.